May 23, 1950   B. J. MAYLAND ET AL   2,508,723
SEPARATION OF HYDROCARBONS
Filed Jan. 2, 1948
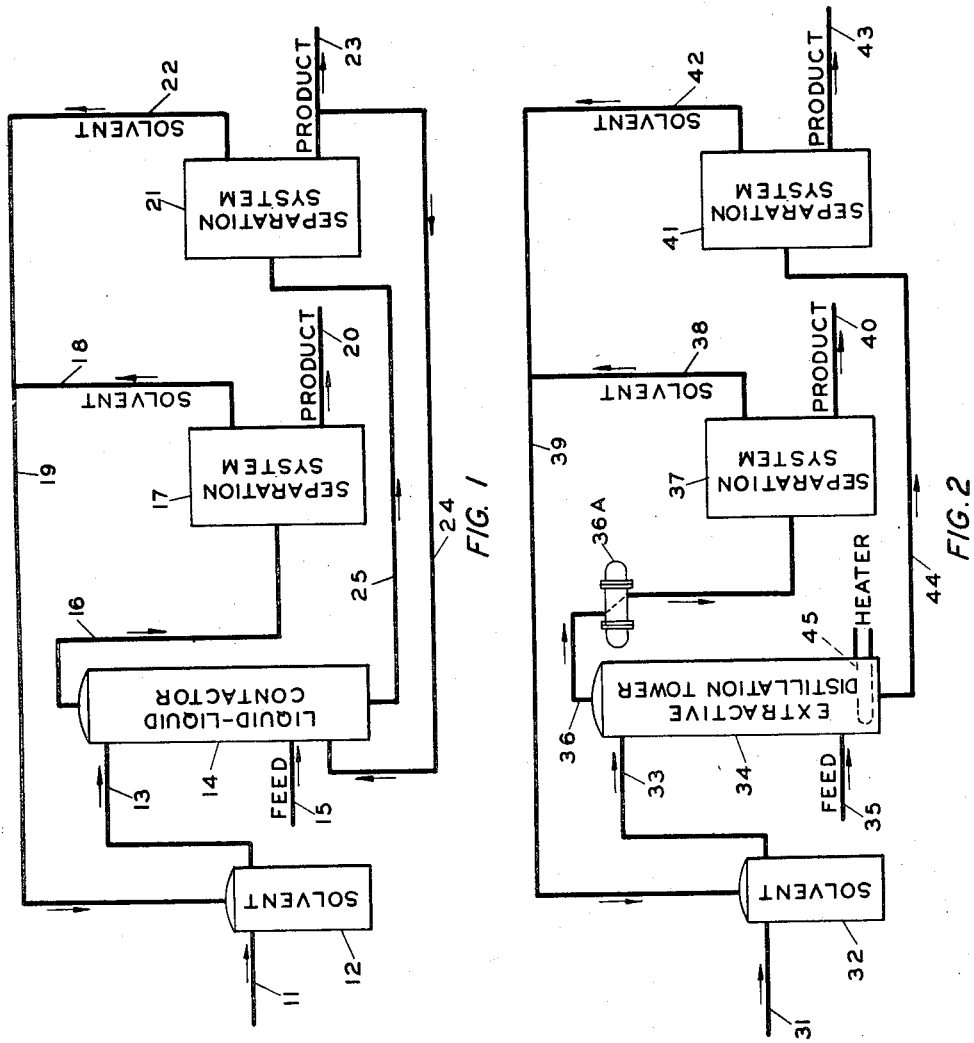
INVENTORS.
F. N. RUEHLEN
B. J. MAYLAND
E. E. WHITE
BY Hudson & Young
ATTORNEYS Patented May 23, 1950

2,508,723

UNITED STATES PATENT OFFICE 2,508,723

SEPARATION OF HYDROCARBONS

Bertrand J. Mayland and Forrest Nolan Ruehlen, Bartlesville, Okla., and Edward E. White, White Sulphur Springs, W. Va., assignors to Phillips Petroleum Company, a corporation of Delaware Application January 2, 1948, Serial No. 246

14 Claims. (Cl. 260—666)

This invention relates to a process for the separation of hydrocarbons. In one of its more specific aspects it relates to a process for the separation of hydrocarbons richer in hydrogen content from hydrocarbons poorer in hydrogen content. In a still more specific aspect it relates to separation of hydrocarbons of the following classes of hydrocarbons: paraffins, cycloparaffins, olefins, diolefins, and aromatics. From these classes of hydrocarbons a hydrocarbon from one class may be separated from a hydrocarbon from a class preceding or following the first mentioned class in this sequence of classes. For example, an aromatic compound may be separated from a mixture containing the aromatic compound and a diolefin compound, likewise an olefin compound may be separated from a mixture containing this olefin and paraffin compounds.

We have discovered that a class of compounds termed generally the bis-chloroformate esters of the lower aliphatic polyglycols is effective for separating hydrocarbons of the above mentioned series of hydrocarbon classes. As examples of the bis-chloroformate esters which are suitable for our process may be mentioned diethylene glycol-bis-chloroformate, dipropylene glycol-bis-chloro-formate, triethylene glycol-bis-chloro-formate, tripropylene, glycol-bis-chloroformate and other like bis-chloroformates which are liquids at operating temperatures.

The separation, by solvent extraction, of hydrocarbons differing in degrees of saturation is well known to the art. Numerous organic compounds have been found to be more or less selective in their ability to dissolve hydrocarbons of various types, based on degree of saturation. A few of these compounds, for example, furfural, $\beta,\beta'$-dichloro-diethyl ether, and pyridine, and others have actually been used in commercial processes for the separation of hydrocarbons into paraffinic and nonparaffinic types, or for the separation and recovery of one individual hydrocarbon from admixture with others. The separation of mixtures of hydrocarbons into individual compounds by ordinary fractional distillation is often difficult if not impossible, because of the formation of constant boiling point mixtures or because of the fact that the boiling points of certain pairs of compounds desired to be separated are too close together. For example, two compounds which boil within 4 or 5°, or even 8 to 10° F., of one another are very difficult to separate from one another because a fractionating column having several hundred trays may be required operating under an extremely great reflux ratio. Such separations are usually not attempted commercially because of economic considerations.

We have found that the separation of certain pairs of close boiling hydrocarbons may be carried out readily in conventional equipment when the novel selective solvents of our invention are employed. By means of this invention aromatic hydrocarbons may be separated from naphthenic hydrocarbons, diolefins may be separated from olefins or paraffins, and naphthenes may be separated from paraffins or from aromatics. Thus benzene may be separated from cyclohexane, butadiene from $C_4$ olefins, the $C_4$ olefins from $C_4$ paraffins or normal hexane from such a cycloparaffin as methyl cyclopentane. Each compound mentioned as being separable from a compound of another class has a boiling point very close to the boiling point of a compound or compounds of the other class mentioned.

Included in the term paraffins are alkyl derivatives of paraffin hydrocarbons since the solvents of our invention are adapted to the separation of, for example, branched chain paraffins such as methyl, ethyl, or other alkyl derivative of a butane or of a pentane from an olefin as well as straight chain paraffins. In like manner the term cycloparaffins as used throughout the specification and claims is intended to include alkyl substitution derivatives of the cycloparaffins, as for example, methyl cyclopentane. In like manner alkyl derivatives of the olefins, diolefins and the aromatic compounds are to be considered included in the terms olefins, diolefins, and aromatics, respectively.

Our process may best be applied to the separation of hydrocarbons of the above mentioned classes in the liquid state. The hydrocarbons to be separated may be normally gaseous hydrocarbons or normally liquid hydrocarbons or mixtures thereof. When treating one or more normally gaseous hydrocarbons, it is merely necessary to operate under sufficient pressure that the normally gaseous hydrocarbon be charged to the treating system as a liquid.

An object of this invention is to provide a method for the separation of close boiling hydrocarbons of certain groups of hydrocarbons.

Another object of our invention is to provide a method for the separation of close boiling groups of hydrocarbons which method or process may be carried out in equipment ordinarily available.

Still another object of our invention is to provide such a process which does not require the use of special, uncommon, or relatively expensive equipment.

Still another object of our invention is to provide a process for the separation of certain members of groups of close boiling hydrocarbons into relatively pure components and which process is simple to operate.

Many other objects and advantages will be apparent to those skilled in the art upon reading the following disclosure taken with the accompanying drawing, which respectively describes and illustrates the process of our invention.

In the drawing, Figure 1 represents diagrammatically one form of apparatus in which one embodiment of our process may be carried out. Figure 2 represents diagrammatically another form of apparatus in which a second embodiment of our invention may be practiced.

The process of this invention may be carried out in conventional equipment of the type usually employed for effecting intimate contact between two liquid phases, or between a liquid phase and a gaseous phase. Thus, in one embodiment the liquid mixture of hydrocarbons to be separated is fed into a suitable vertically disposed contacting vessel at an intermediate point, and the novel solvent of our invention is introduced at a point near the top. The solvent flows downward, countercurrent to the rising hydrocarbons, and selectively removes the more unsaturated hydrocarbons so that the stream leaving the bottom of the column comprises the greater portion of the solvent and substantially all of the more unsaturated hydrocarbon. The overhead stream comprises a substantially pure hydrocarbon (the more saturated component of the feed) plus a minor amount of the solvent. The separation of the solvent from the hydrocarbons may be accomplished by conventional means such as distillation, or by solvent extraction of the mixture with a secondary solvent as disclosed in the copending application of Karl H. Hachmuth, Serial No. 130, filed January 2, 1948. In this latter method the secondary solvent removes the hydrocarbon from the primary solvent in a second liquid-liquid contacting step, and the hydrocarbon is then separated from the secondary solvent by distillation. Such a procedure is particularly advantageous when the primary solvent is quite high boiling as in the case of the bis-chloroformate esters of the present invention.

In another embodiment of the invention, the hydrocarbons to be separated are fed into the lower portion of an extractive distillation tower, into which the solvent is introduced near the top. The column is provided with suitable means for effecting contact between the descending liquid solvent and ascending hydrocarbon vapors. Suitable heating means are provided in the bottom of the tower, so that the hydrocarbon vapors are continuously driven upward. The hydrocarbon which is the more volatile in the presence of the selective solvent is, of course, taken overhead together with minor amounts of the solvent, while the kettle product comprises the less volatile hydrocarbon and the greater portion of the solvent. Separation of the respective hydrocarbons from the solvent may be carried out as described above. In either embodiment the solvent is recycled to the contacting step (or intermediate surge tank) after it is separated from the hydrocarbon streams.

Referring now to the drawing, Figure 1 represents diagrammatically such apparatus as may be used for carrying out separation of certain pairs or mixtures of hydrocarbons by liquid-liquid extraction using the solvent of our invention as the extractant. In this figure the diethylene glycol-bis-chloroformate may be stored in a run storage tank 12 from which solvent passes through a line 13 to the upper part of a liquid-liquid contactor vessel 14. Sufficient solvent is charged to the vessel 14 to completely fill the vessel. The mixture of hydrocarbons to be separated into component hydrocarbons or into component classes of hydrocarbons from a source, not shown, is passed through a line 15 into the liquid-liquid contactor 14 at a point some little distance below the mid-section of the vessel. The bis-chloroformates herein disclosed as selective solvents are specifically more dense or heavier than the hydrocarbons to be treated and accordingly hydrocarbons which remain undissolved and as a separate hydrocarbon phase in the contactor 14 tend to rise through the column of solvent and accumulate as a liquid layer in the top of the column. This liquid phase, called the raffinate phase, is removed through line 16 into a vessel 17. The hydrocarbons entering the contactor through line 15, as mentioned, rise through the column of solvent and at the same time the solvent upon entering the column through line 13 flows downward through the column and the solvent phase is removed from the bottom through a line 25. Thus, there is set up in the contactor 14 a countercurrent liquid-liquid contacting operation.

This raffinate phase or mixture is passed through the line 16 to the separation system 17, which may be any system desired for the separation of the solvent which is carried out in solution in the hydrocarbon layer through line 16. This separation system may be one involving fractional distillation for separation of the solvent from the hydrocarbon in case sufficient difference in boiling points of the components of the raffinate phase exists. The solvent recovered by this separation may be passed through a pipe represented by line 18 and another line 19 for return to the solvent run storage tank 12, and the hydrocarbon may be removed via line 20.

This separation system 17 need not necessarily be a fractionator since if desired the solvent and hydrocarbon may be separated in a second solvent extraction system. In this latter system the solvent entering contactor 14 through line 13 may be termed the primary solvent while the solvent introduced into the separation system 17 for removal of one component from the raffinate phase from the contactor 14 may be termed the secondary solvent. In this type of operation the secondary solvent is preferably selected so as to extract the primary solvent from the raffinate phase being treated in the separator 17. In this type of system then the primary solvent and the secondary solvent may be separated from one another by distillation and the recovered primary solvent recycled to the primary run storage tank 12 and the secondary solvent recycled to a run storage tank for the secondary solvent which tank is not shown on the drawing. Alternatively, if desired, the secondary solvent may be selected from among those adapted to extract the hydrocarbon from the raffinate phase being treated in the separation system 17, as disclosed in the above-mentioned copending application of Karl H. Hachmuth.

The extract phase leaving the liquid-liquid contactor 14 through the line 25 is conducted to a separation system 21. In this separation system 21 the primary solvent is separated from the extracted hydrocarbons, the latter leaving separation system 21 through a product line 23 for such disposal as desired and the solvent leaving through a line 22 for passage through the line 19 to the solvent storage tank 12.

This separation system 21 may be a fractionator tower similar to that described in connection with separation system 17 or it may be a secondary solvent extraction system similar to that explained also in connection with system 17. A portion of the product issuing from the separator 21 through line 23 may be recycled through a pipe 24 into the lower portion of the contactor vessel 14 to increase the yield of the raffinate phase and to increase the purity of the hydrocarbon in the extract phase.

In such a system as illustrated in Figure 1, cyclohexane may be separated from a mixture containing, for example, 85 mol per cent of cyclohexane and 15 per cent of benzene. The cyclohexane being a cycloparaffin is less soluble in our solvent than the benzene and accordingly the cyclohexane containing a small amount of solvent separates as a raffinate phase and after removal of the solvent from the raffinate phase cyclohexane of about 98 per cent purity results. Makeup solvent as needed may be added to the system through a line 11.

Figure 2 of the drawing represents diagrammatically a system for carrying out an extractive distillation operation wherein our solvent is used as the extractant. In this figure some solvent, for example, diethylene glycol-bis-chloroformate from a run storage tank 32 is passed through a line 33 into the upper portion of a distillation column 34. This distillation column 34 is equipped with contacting apparatus such as bubble cap tray combinations, packing, or other contacting means so as to promote good contact between rising vapors and downflowing liquid. This column 34 is for the most part operated like most any distillation column with the exception that there are two feed lines entering the column. One feed line is the line 33 attached to the top of the column for adding liquid solvent. The second feed line 35 to the column is for the purpose of adding the hydrocarbon mixture to be separated into classes of hydrocarbons or individual hydrocarbons of different classes. At the bottom of the column is a reboiler section which is equipped with a reboiler coil 45. This coil may be heated by any means whatever but as is ordinarily practiced coil 45 may be a closed steam coil. In any event heat from the coil 45 furnishes sufficient heat to the liquid accumulating in the reboiler section to vaporize a portion of the hydrocarbon content of the solvent reaching the reboiler section. The vaporized hydrocarbon from the reboiler section flows upward through the column and acts as a stripping agent for stripping further hydrocarbon from the downflowing solvent at all points of a column above the reboiler section. Since certain of the hydrocarbons to be separated in this column are more soluble in the solvent than the other hydrocarbons, these more soluble hydrocarbons will exert a lower partial pressure in the vapor state than will the hydrocarbons which are less soluble in the solvent at the same temperature. In this manner there will be concentrated in the vapor phase in this column hydrocarbon or hydrocarbons which are less soluble in the solvent and such hydrocarbon vapors upon reaching the top of the tower will be removed therefrom through an overhead line 36 and pass through a condenser 36a and the condensate therefrom passed into a separation system 37. This separation system 37 may be any kind of separation system adapted to remove the dissolved hydrocarbon from the solvent; for example, it may be a secondary solvent extraction system or a distillation system. The operation of the separation system may be similar to that described in conjunction with the separation system 17 and 21 of Figure 1. In any event any small quantities of solvent carried out with the overhead vapors through line 36 are passed from the separation system 37 through a line 38 through a line 39 into the solvent storage tank 32. Hydrocarbon product from the separation system is removed through product line 40 for such disposal as desired.

The extractive distillation column bottoms leave the column through the bottom draw-off line 44 and are passed to a separation system 41. This separation system 41 may likewise be a distillation system or an extraction system whichever may be desired. In any event the solvent recovered from the extract leaves the separation system through a line 42 and it passes through a return line 39 in which it is combined with the solvent from line 38, the mixture being passed to the solvent storage tank 32. Hydrocarbon product from the separation system 41 leaves the system through a line 43 to such disposal as desired.

In Figures 1 and 2 valves, pumps, meters, flow regulators and other auxiliary equipment have not been shown for purposes of simplicity. The use of such equipment is well known in the art.

Makeup solvent for use in the system illustrated in Figure 2 may be passed into the solvent storage tank 32 through a line 31.

To illustrate the method of our invention the following examples are given:

*Example I*

Solvent: Diethylene glycol-bis-chloroformate.
Feed: Normal hexane 85 mol per cent, methylcyclopentane 15 mol per cent.
Extraction temperature: 100° F.
Pressure: 1 atmosphere gage.
Contactor: Liquid-liquid with 11 theoretical stages.
Solvent: Hydrocarbon, mol ratio 2:1.
Overhead product: 36.3 mols of hydrocarbon per 100 mols of hydrocarbon feed after separation of the solvent. This hydrocarbon contained 98 mol per cent normal hexane.
Bottoms product: 14.3 mols methylcyclopentane and 49.5 normal hexane per 100 mols of feed and after separation of the solvent.

This data given in Example I was obtained on a once-through basis and did not involve recycling of extract product as for example through line 24 to the liquid-liquid contactor 14. As mentioned hereinbefore, such recycling increases the yield of the raffinate phase and decreases the number of mols of normal hexane in the extract phase.

*Example II*

Solvent: Diethylene glycol-bis-chloroformate.
Feed: Cyclohexane 85 mol per cent, benzene 15 mol per cent.
Temperature: 70° F.
Pressure: 1 atmosphere gage.
Contactor: Liquid-liquid, three equilibrium steps,
Solvent: Hydrocarbon.
Mol ratio: 1:1.

Overhead product: The overhead product or raffinate phase contains 69.3 mols cyclohexane, .7 mol benzene and 15 mols of solvent per 100 mols of hydrocarbon feed.

Extract phase: Contains 15.7 mols cyclohexane, 14.3 mols benzene and 85 mols of solvent per 100 mols of hydrocarbon feed.

In a manner as stated under Example I, the yield of cyclohexane in the raffinate may be increased markedly by recycling the extract hydrocarbons after removal of the solvent to a point in the lower portion of the extraction vessel.

*Example III*

Solvent: Diethylene glycol-bis-chloroformate.
Feed: Cyclohexane 85 mol per cent and 15 mol per cent benzene.
Contactor: Extractive distillation column (of Figure 2) 20 trays.
Temperature: Bottom of column 250° F.
Pressure: 50 mm. Hg.
Solvent: Hydrocarbon.
Mol ratio: 10:1.
Overhead product: The overhead product consisted of 73 mols per 100 mols of feed and contained 98 mols per cent of cyclohexane on a solvent free basis.
Bottoms product: The extract phase contained 13.5 mols cyclohexane, 13.5 mols benzene and 1000 mols of solvent per 100 mols of feed.

The vacuum in the extractive distillation step of our invention may be obtained by use of a steam jet or other conventional means not shown. Such auxiliary apparatus as valves, controllers, pumps, temperature measuring devices and the like, the use of which is well known in the art, are not shown herein for purposes of simplicity.

We claim:

1. A process for separating one hydrocarbon from an admixture of hydrocarbons having boiling points close to each other where said hydrocarbons are of different types, said hydrocarbons being selected from the group consisting of paraffins, cycloparaffins, olefins, diolefins and aromatics, comprising mixing said admixture of close boiling hydrocarbons with diethylene glycol-bis-chloroformate, separating this mixture into two phases and recovering at least one of said close boiling hydrocarbons from one of said phases.

2. A process for separating one hydrocarbon from an admixture of hydrocarbons having boiling points close to each other where said hydrocarbons are of different types, said hydrocarbons being selected from the group consisting of paraffins, cycloparaffins, olefins, diolefins and aromatics, comprising mixing said admixture of close boiling hydrocarbons in the liquid state, with diethylene glycol-bis-chloroformate, subjecting the mixture to liquid-liquid extraction conditions, separating this mixture into two phases and recovering at least one of said close-boiling hydrocarbons from the phase lean in diethylene glycol-bis-chloroformate.

3. A process for separating one hydrocarbon from an admixture of hydrocarbons having boiling points close to each other where said hydrocarbons are of different types, said hydrocarbons being selected from the group consisting of paraffins, cycloparaffins, olefins, diolefins and aromatics, comprising mixing said admixture of close boiling hydrocarbons in the liquid state with diethylene glycol-bis-chloroformate, subjecting said mixture to distillation conditions whereby an overhead vaporous phase and a bottoms liquid phase are produced and recovering at least one of said close boiling hydrocarbons from the overhead vaporous phase.

4. A process for separating one hydrocarbon from an admixture of hydrocarbons having boiling points close to each other where said hydrocarbons are of different types, said hydrocarbons being selected from the group consisting of paraffins, cycloparaffins, olefins, diolefins and aromatics, comprising mixing said admixture of close boiling hydrocarbons with a normally liquid bis-chloroformate ester of an aliphatic polyglycol, separating this mixture into two phases and recovering at least one of said close boiling hydrocarbons from the phase lean in diethylene glycol-bis-chloroformate.

5. A process for separating a paraffin hydrocarbon from an admixture of other hydrocarbons containing said paraffin hydrocarbon and having boiling points close to each other and close to the boiling point of said paraffin hydrocarbon where said other hydrocarbons are of different types, said other hydrocarbons being selected from the group consisting of cycloparaffins, olefins, diolefins and aromatics, comprising mixing said admixture of close boiling hydrocarbons with diethylene glycol-bis-chloroformate, separating this mixture into two phases and recovering said paraffin hydrocarbon from the phase lean in diethylene glycol-bis-chloroformate.

6. A process for separating a cycloparaffin hydrocarbon from an admixture of other hydrocarbons containing said cycloparaffin hydrocarbon and having boiling points close to each other and close to the boiling point of said cycloparaffin hydrocarbon where said other hydrocarbons are of different types, said other hydrocarbons being selected from the group consisting of olefins, diolefins and aromatics, comprising mixing said admixture of close boiling hydrocarbons with diethylene glycol-bis-chloroformate, separating this mixture into two phases and recovering said cycloparaffin hydrocarbon from the phase lean in diethylene glycol-bis-chloroformate.

7. A process for separating an olefin hydrocarbon from admixture with a diolefin hydrocarbon, said olefin hydrocarbon having a boiling point near the boiling point of said diolefin hydrocarbon, comprising mixing said admixture of close boiling hydrocarbons with diethylene glycol-bis-chloroformate, separating this mixture into two phases and recovering the olefin hydrocarbon from the phase lean in diethylene glycol-bis-chloroformate.

8. A process for separating a paraffin hydrocarbon from an admixture of other hydrocarbons containing said paraffin hydrocarbon and having boiling points close to each other and close to the boiling point of said paraffin hydrocarbon where said other hydrocarbons are of different types, said other hydrocarbons being selected from the group consisting of cycloparaffins, olefins, diolefins and aromatics, comprising mixing said admixture of close boiling hydrocarbons with diethylene glycol-bis-chloroformate, subjecting the mixture to liquid-liquid extraction conditions, separating this mixture into two phases and recovering said paraffin hydrocarbon from the phase lean in diethylene glycol-bis-chloroformate.

9. A process for separating a cycloparaffin hydrocarbon from an admixture of other hydrocarbons containing said cycloparaffin hydrocarbon and having boiling points close to each other and close to the boiling point of said cycloparaffin hydrocarbon where said other hydrocarbons are of different types, said other hydrocarbons being selected from the group consisting of olefins, diolefins and aromatics, comprising mixing said admixture of close boiling hydrocarbons with diethylene glycol-bis-chloroformate, subjecting the mixture to liquid-liquid extraction conditions, separating this mixture into two phases and recovering said cycloparaffin hydrocarbon from the phase lean in diethylene glycol-bis-chloroformate.

10. A process for separating an olefin hydrocarbon from admixture with a diolefin hydrocarbon, said olefin hydrocarbon having a boiling point near the boiling point of said diolefin hydrocarbons, comprising mixing said admixture of close boiling hydrocarbons with diethylene glycol-bis-chloroformate, subjecting the mixture to liquid-liquid extraction conditions, separating this mixture into two phases and recovering the olefin hydrocarbon from the phase lean in diethylene glycol-bis-chloroformate.

11. A process for separating a paraffin hydrocarbon from an admixture of other hydrocarbons containing said paraffin hydrocarbon and having boiling points close to each other and close to the boiling point of said paraffin hydrocarbon where said other hydrocarbons are of different types, said other hydrocarbons being selected from the group consisting of cycloparaffins, olefins, diolefins and aromatics, comprising mixing said admixture of close boiling hydrocarbons with diethylene glycol-bis-chloroformate, subjecting said mixture to distillation conditions whereby an overhead vaporous phase and a bottoms liquid phase are produced and recovering said paraffinic hydrocarbon from said overhead vaporous phase.

12. A process for separating a cycloparaffin hydrocarbon from an admixture of other hydrocarbons containing said cycloparaffin hydrocarbon and having boiling points close to each other and close to the boiling point of said cycloparaffin hydrocarbon where said other hydrocarbons are of different types, said other hydrocarbons being selected from the group consisting of olefins, diolefins and aromatics, comprising mixing said admixture of close boiling hydrocarbons with diethylene glycol-bis-chloroformate, subjecting said mixture to distillation conditions whereby an overhead vaporous phase and a bottoms liquid phase are produced and recovering said cycloparaffin hydrocarbon from said overhead vaporous phase.

13. A process for separating an olefin hydrocarbon from admixture with a diolefin hydrocarbon, said olefin hydrocarbon having a boiling point near the boiling point of said diolefin hydrocarbon, comprising mixing said admixture of close boiling hydrocarbons with diethylene glycol bis-chloroformate, subjecting said mixture to distillation conditions whereby an overhead vaporous phase and a bottoms liquid phase are produced and recovering the olefin hydrocarbon from said overhead vaporous phase.

14. A process for separating normal hexane from admixture with methylcyclopentane comprising mixing said admixture of hydrocarbons with diethylene glycol-bis-chloroformate, subjecting this mixture to liquid-liquid extraction conditions, separating the mixture into two phases and recovering the normal hexane from the phase lean in diethylene glycol-bis-chloroformate.

BERTRAND J. MAYLAND.
FORREST NOLAN RUEHLEN.
EDWARD E. WHITE.

REFERENCES CITED

The following references are of record in the file of this patent:

UNITED STATES PATENTS

| Number | Name | Date |
|---|---|---|
| 1,908,018 | Henderson | May 9, 1933 |
| 2,064,338 | Brown et al. | Dec. 15, 1936 |